United States Patent [19]
Armstrong

[11] Patent Number: 4,810,078
[45] Date of Patent: * Mar. 7, 1989

[54] RETRACTABLE EYESHIELD

[76] Inventor: Jeffrey A. Armstrong, 9644 Observation Dr., Kirkland, Wash. 98033

[*] Notice: The portion of the term of this patent subsequent to Mar. 8, 2005 has been disclaimed.

[21] Appl. No.: 109,437

[22] Filed: Oct. 16, 1987

[51] Int. Cl.[4] ..................... G02B 23/00; G03B 11/00; G03B 13/00
[52] U.S. Cl. .................................. 350/578; 350/145; 350/319; 354/219; 358/229
[58] Field of Search ............... 350/578, 145, 319, 537; 354/219, 224, 225; 358/224, 229

[56] References Cited

U.S. PATENT DOCUMENTS 4,729,648  3/1988  Armstrong ........................... 350/578

FOREIGN PATENT DOCUMENTS

1463525  11/1966  France ................................. 350/578

Primary Examiner—Bruce Y. Arnold
Assistant Examiner—Terry S. Callaghan
Attorney, Agent, or Firm—Christensen, O'Connor, Johnson & Kindness

[57] ABSTRACT

A retractable, partial eyeshield assembly is attached to a single eye sighting device attached to, for example, a video camera. The partial eyeshield assembly is constructed so that it covers a portion of the medial field of view of the user's nonsighting eye. The obstructed portion of the nonsighting eye's medial field of view corresponds to that portion of the sighting eye's that contains only the image transmitted through the single eye sighting device's sighting aperture. By obstructing the portion of the nonsighting eye's medial field of view, the corresponding field of view in the sighting eye dominates. The obstruction of the portion of the nonsighting eye's field of view is achieved without obstructing a substantial portion of the nonsighting eye's peripheral and medial fields of view.

25 Claims, 3 Drawing Sheets

RETRACTABLE EYESHIELD

BACKGROUND OF THE INVENTION

The present invention relates to eyeshields, more particularly to opaque eyeshields that are used for partially shielding the field of view of one eye while the other eye is sighting an object through a single eye sighting device.

It is often desirable to use a sighting device to assist the eye. Some sighting devices, such as view finders for cameras, are attached to or incorporated in other devices that are aimed; others, such as microscopes and small telescopes, are themselves devices that are aimed. The term "sighting device," as used herein, includes both types of sighting devices and encompasses any devices that the first type may be attached to or incorporated therein.

Sighting devices used by only one eye at a given moment are referred to herein as single eye sighting devices. Such sighting devices, by occupying at least a portion of the binocular region of the user's binocular field of view, may cause a user to experience binocular rivalry. The binocular field of view is the entire area visible to both eyes at a given moment. At the center of the binocular field is a binocular region which is the region common to the fields of view of both eyes.

For each and every portion of one eye's field of view lying in the binocular region, there is a corresponding portion of the other eye's field of view that lies in the same part of the binocular region. Binocular rivalry is a temporal alternation in what the observer sees between the image in the right eye's field of view and the image in the left eye's field of view. Binocular rivalry results when the two images are in corresponding portions of the two eye's fields of view and are sufficiently different in brightness, color and contour so as not to fuse into a single perceived image as they normally would. At a given moment, the image in the field of view of one eye predominates while the other is suppressed, then suddenly the suppressed images emerges into perception and dominates the image that was predominant. This phenomena of alternating dominant images discomforts the single eye sighting device user and inhibits him in his use of the device. Thus, it is virtually impossible to comfortably and accurately perceive the desired image through the single eye sighting device.

One way single eye sighting device users have attacked the problem of binocular rivalry is by closing the eye that is not using the single eye sighting device by contracting the facial muscles surrounding the free eye. However, this method leads to muscle fatigue, headache and other discomfort associated with that condition, especially during long periods of continuous sighting. Another way single eye sighting device users have attacked the problem is by using devices for occupying the nonsighting eye's entire field of view and eliminating the image that is in it. Such devices are hereinafter referred to as "eyeshields." While the method of using eyeshields solves the problem of muscle fatigue associated with closing the free eye, it is not entirely satisfactory because it relies on elimination of the entire nonsighting eye's field of view, both medial and peripheral, for stopping binocular rivalry. Accordingly, eyeshields result in the elimination of vision that is of use to the single eye sighting device user, referred to hereinafter as "usuable vision." Usable vision may be medial or peripheral vision. Medial vision is vision in the eye's medial field of view, i.e., that portion of the eye's field of view that lies in the binocular region of the binocular field of view. Peripheral vision is vision in the eye's peripheral field of view, i.e., that portion of the eye's field of view that lies outside the medial portion. The single eye sighting device user often relies upon peripheral or medial vision in the nonsighting eye for locating objects at which he wishes to aim and for keeping his body out of harm's way, for example, walking up or down stairs, or even walking on the level with obstacles in the user's path. The total elimination of this vision that accompanies the elimination of binocular rivalry by closing one eye or using a conventional eyeshield significantly reduces his ability to effectively use the device, especially in situations where the device must be used continuously for relatively long stretches of time.

Therefore, it is desirable to provide an apparatus that will prevent the phenomena of alternating dominating images without suffering from the drawback of eliminating substantially all of the single eye sighting device user's medial and peripheral vision.

SUMMARY OF THE INVENTION

The present invention provides such an apparatus that is simple and easy to use and is readily adaptable to existing single eye sighting devices. The present invention is a retractable, partial eyeshield assembly for use by a person having a sighting eye and a nonsighting eye, in conjunction with a single eye sighting device having a sighting aperature. The partial eyeshield assembly includes a partial shielding means having dimensions effective to occupy a portion of the nonsighting eye's medial field of view that substantially corresponds to the portion of the sighting eye's field of view that contains only the image transmitted through the single eye sighting device's sighting aperture.

More specifically, the present invention comprises a support arm for slidably mounting the partial shielding means thereon, the support arm allowing sliding adjustment of the partial shielding means to position the partial shielding means before the nonsighting eye, thus allowing the image in the portion of the sighting eye's field of view transmitted through the single eye sighting device's sighting aperture to dominate and suppress the image in the corresponding portion of the nonsighting eye's medial field of view. The support arm further allows adjustment of the partial shielding means so that a portion of the nonsighting eye's medial field of view is maintained when the partial shielding means is positioned before the nonsighting eye. The partial shielding means has a channel. The support arm includes a support head and a body capable of being slidably disposed within the channel of the partial shielding means.

The retractable, partial eyeshield assembly further includes a support housing for the support head. The support housing includes a means for accepting and retaining the support head for swinging movement between first and second positions. The support housing is attached to the single eye sighting device by a fastening means. The fastening means secures the support housing to the single eye sighting device so that the partial shielding means may be placed before the nonsighting eye.

In a preferred embodiment, the portion of the nonsighting eye's medial field of view that is maintained corresponds to the portion of the sighting eye's field of view which does not contain the image transmitted through the single eye sighting device's sighting aperture. Also the preferred embodiment, the portion of the nonsighting eye's medial field of view which is maintained corresponds to the portion of the sighting eyes field of view which does not contain the image transmitted through the single eye sighting devices sighting aperture.

BRIEF DESCRIPTIONS OF THE DRAWINGS

Other objects, features and advantages of the present invention will be readily apparent from the following description of certain preferred embodiments thereof, taken in conjunction with the accompanying drawings. It is understood that variations and modifications may be affected without departing from the spirit and scope of the novel concepts of the disclosure.

DETAILED DESCRIPTION OF THE INVENTION

Figure 1:
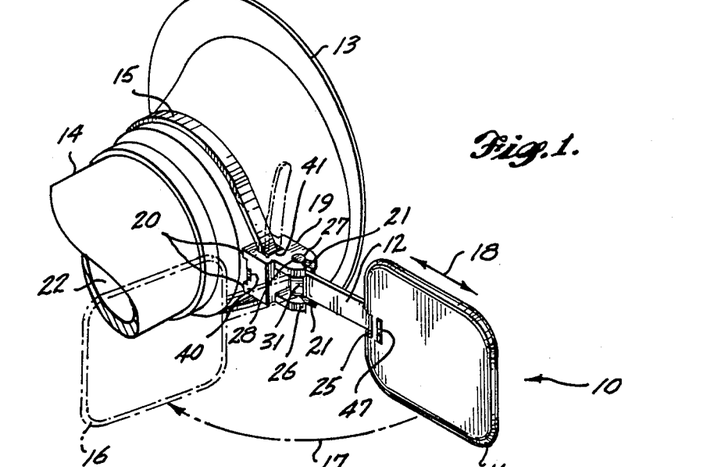
FIG. 1 illustrates a front, isometric, environmental view of the retractable, partial eyeshield assembly of the present invention fastened to a circular eyepiece of a single eye sighting device.

Referring to FIG. 1, a retractable, partial eyeshield assembly 10 of the present invention is illustrated fastened to a single eye view finder 13 of a single eye sighting device (not shown). The device's user (not shown) uses the view finder 13 in order to sight objects (not shown) through the lens 22. The single eye sighting device user positions his/her eye in close proximity to the rear of the view finder 13. The retractable, partial eyeshield assembly 10 is fastened to the view finder 13 by a mounting cable 15.

The fastening cable 15 detachably fastens the support housing 19 to the outer periphery of the view finder 13. The support housing 19 is preferably positioned normal to a vertical tangent of the periphery of the view finder 13. The retractable partial eyeshield assembly 10 when in an extended position is thus positioned substantially within the medial field of view of the nonsighting eye of the single eye sighting device's user. The support housing 19 contacts the view finder 13 with a pair of support legs 20. The manner in which the support housing 19 contacts the view finder 13 is not critical to the present invention as long as the support housing 19 is securely fastened to the view finder 13. The support housing 19 has a fastening passage 41 capable of retaining one end of the mounting cable 15 and allowing the opposite end of the mounting cable 15 to slidably pass through the fastening passage 41 in the direction required to securely fasten the support housing 19 to the view finder 13.

A pair of coupling flanges 26 extend outwardly in a direction normal to the vertical tangent at the point that the support housing 19 is fastened to the view finder 13. The coupling flanges 26 are positioned in a manner so that the top of the first flange 26 is flush with the top of the support housing 19 and the bottom of the second flange 26 is flush with the bottom of the support housing 19. The coupling flanges are offset in a direction towards the rear of the support housing 19. A cylindrical bore passes vertically through both coupling flanges 26. The bore 27 is vertically aligned in each of the coupling flanges 26 and engages a guide slot positioned on the external edge of the coupling flanges 26. The circular bore 27 and the guide slots 21 are dimensioned such that the guide slots 21 are capable of accepting and guiding a circular pivot pin 28 that forms part of the support arm head 29 into the circular bore 27. The coupling flanges 26 are constructed so that when the pivot pin 28 is received by the circular bore 27, the guide slots do not allow ready removal of the pivot 28 from the circular bore 27. More specifically, the guide slot 21 at the point at which it engages the circular bore 27 has a smaller width than the diameter of the pivot pin 28. The material that the coupling flanges 26 are prepared from is flexible enough to allow the guide slots 21 to expand to a width sufficient to allow entry of the pivot pin 28 into the circular bore 27. This construction also allows the support arm to break free of the mounting flanges should inadvertent downward pressure be applied to the support arm, thus preventing damage to the device.

When the support arm head 29 is engaged by the coupling flanges 26, the support arm head 29 which is disposed between the circular pivot pins 28, is positioned in the cavity 45 created between the coupling flanges 26. The support arm head 29 is freely rotatable about the axis of the pivot pins 28 within the cavity 45 created between the coupling flanges 26. The support arm head thus allows swinging adjustment of the partial eyeshield 11 from a first, extended position represented by the solid lines of FIG. 1 to a second, retracted position 16 represented by the dotted line in FIG. 1. The partial eyeshield 11 is swung to its retracted position by movement along the direction of the arrow 17.

Figure 2:
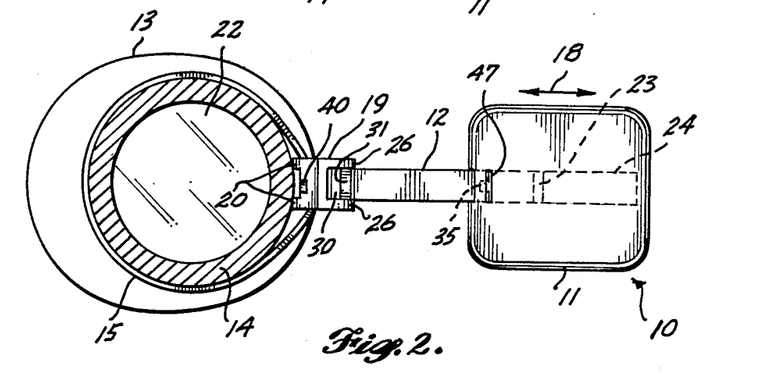
FIG. 2 illustrates a front, elevational, environmental view of the retractable, partial eyeshield assembly of the present invention fastened to a circular viewing eyepiece.

Referring now to FIGS. 1 and 2, the support arm head 29 is located on the interior end of the support arm 12. The partial eyeshield 11 is slidably mounted on the outer end of the support arm 12. As will be discussed in more detail below, the outer end of the support arm is received through an opening 25 into an elongate internal channel 24 extending lengthwise through the partial eyeshield 11. The partial eyeshield 11 is thus mounted for sliding movement in a transverse direction relative to the eyepiece as indicated by the arrows 18. The partial eyeshield is maintained in a desired position by the interaction of the support arm 12 and a spring means 32 positioned in the internal channel 24.

Referring now to FIGS. 2, 4, 8 and 9, the view finder 13 is shown as a circular eyepiece and lens 22. The retractable, partial eyeshield assembly 10 is attached by the mounting cable 15 to the circular lens housing 14 of the view finder 13. Located on the exterior end of the support arm 12 is a flange 23 for restricting the range of horizontal movement 18 of the partial eyeshield 11. The range of movement 18 of the partial eyeshield 11 is restricted by the flange 23 contacting the exterior end of the spring means 32 whose spring finger 35 is positioned adjacent to the slot 47 for the spring ribs 33.

Figures 4, 5:
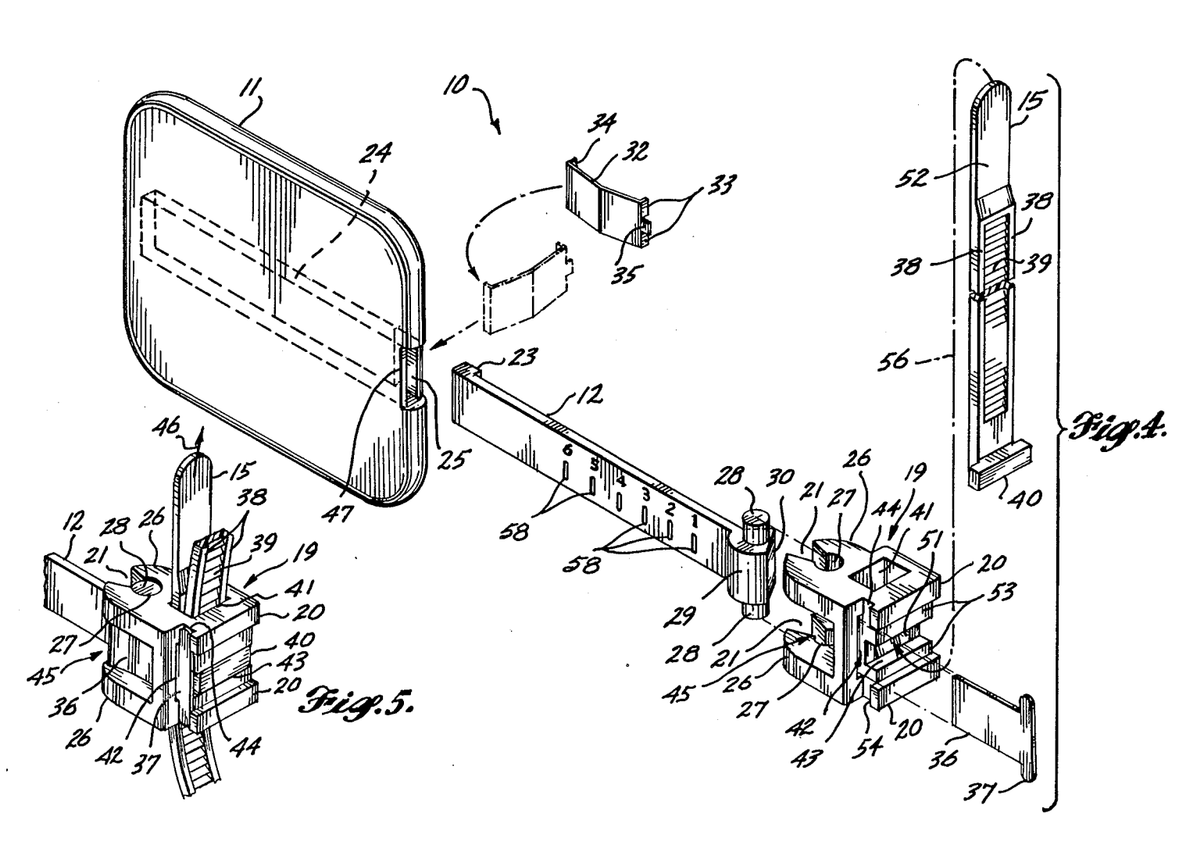
FIG. 4 illustrates an exploded, rear isometric view of the retractable, partial eyeshield assembly of the present invention.
FIG. 5 illustrates a detailed, rear isometric view of the support housing and fastening means of the present invention.

A more detailed description of the particular components making up the retractable, partial eyeshield assembly 10 of the present invention will be described with reference to the remaining Figures. Referring to FIG. 4, the present invention comprises a mounting cable 15, a support housing 19, a support arm 12, a partial eyeshield 11, a spring means 32, and a spring means 36.

Figures 6, 7, 8, 9:
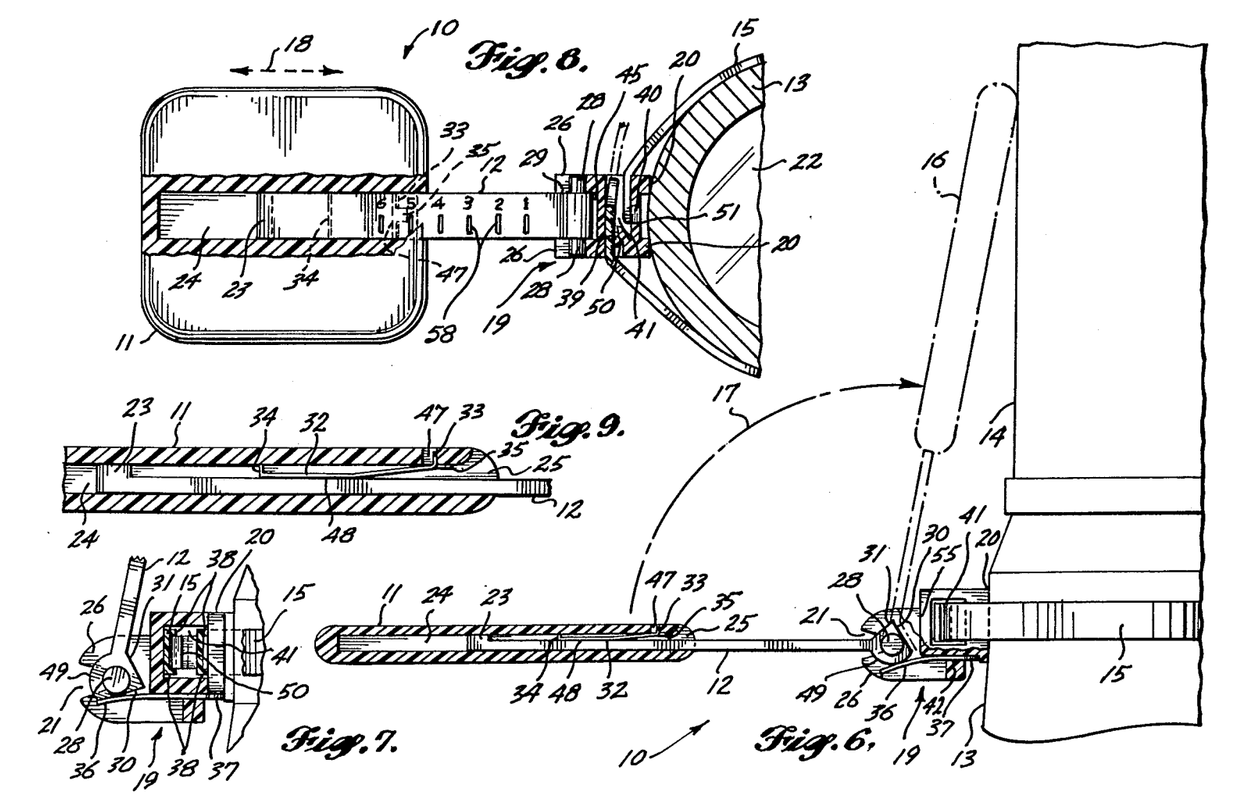
FIG. 6 illustrates a top, cutaway, environmental view of the retractable, partial eyeshield assembly of the present invention fastened to a viewing eyepiece and illustrating the shielding means in an extended and a retracted position.
FIG. 7 illustrates a detailed, top, cutaway view of the support housing and support head of the present invention.
FIG. 8 illustrates a rear, partially cutaway, elevational, environmental view of the retractable, partial eyeshield assembly of the present invention fastened to a circular viewing eyepiece.
FIG. 9 illustrates a top, cutaway view of the partial shielding means and support arm in accordance with the present invention.

Referring to FIGS. 4 and 8, the fastening cable 15 is preferably a flexible polymeric material that is capable of being securely wrapped around the view finder 13 for fastening the support housing 19 to a view finder 13. As shown in FIG. 4, the top portion of the fastening cable is a thin, smooth member capable of passing through the cable entry 51 in the support housing 19. The fastening cable 15 has one surface that is smooth and the other surface includes a plurality of fastening teeth 39 for securing the fastening cable 15 to the support housing 19. On the side opposite the smooth surface are a pair of cable ribs 38 along the outer edges of the fastening cable 15. The ribs are positioned so that the outer edges of the ribs are flush with the outer edges of the fastening cable 15. The ribs 38 increase the thickness of the fastening cable 15 along the remaining length of the fastening cable 15. Between the first and second ribs 38 are the plurality of teeth 39 for securing the fastening cable 15 to the support housing 19 once the fastening cable 15 has been fastened around the view finder 13. A cable lug 40 is positioned at the end opposite the thin portion of the fastening cable 15 that enters the cable entry 51. The cable lug 40 secures the fastening cable 15 to the support housing 19, prior to the step in which the fastening cable 15 is fastened around the view finder 13 and secured by the teeth 39. The cable lug 40 is a rectangular bar positioned horizontally on top of the ribs 38. The cable lug 40 is wider than the fastening cable 15. The cable lug 40 has dimensions that allows the cable lug 40 to mate relatively closely with the fastening groove 43 of the support arm housing 19. The fastening groove 43 joins the fastening passage 41 and the exterior of the support housing 19. As shown in FIG. 8, the cable lug 40 securely fastens the fastening cable 15 to the support arm housing 19 after the thin leading end of the fastening cable 15 has passed through the cable entry 51 in a manner illustrated by the broken line 56 in FIG. 4. The fastening cable 15 is placed around the circumference of the view finder 13 and reentered into the bottom of the support arm housing 19 through the fastening passage 41. The teeth 39 are engaged by the pawl 50 that is located on the interior wall of the fastening passage 41. The cooperation of the teeth 39 and the pawl 50 allow the upward passage of the fastening cable 15 through the fastening passage 41 while restricting the downward removal of the fastening cable 15 from the fastening passage 41.

Figure 3:
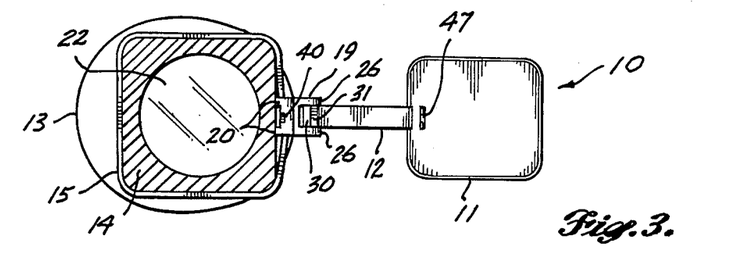
FIG. 3 illustrates a front, elevational, environmental view of the retractable, partial eyeshield assembly of the present invention fastened to a square viewing eyepiece.

Referring to FIG. 3, the retractable, partial eyeshield assembly 10 is illustrated attached alternatively to a square lens housing 14 containing a circular lens 22 by fastening cable 15. Because the fastening cable 15 is flexible, the partial eyeshield assembly can be attached not only to square and circular lens housings 14, but also to other shapes of lens housings.

Referring to FIG. 4, the support legs 20 of the support arm housing 19 contact the view finder 13 near a vertical tangent. The support legs 20 sturdily mount the support arm housing 19 to the view finder 13. Each of the support legs 20 steps down to a fastening groove wall 53. The fastening groove walls 53 are the vertical boundaries of the fastening groove 43 into which the fastening lug 40 is seated. The forward ends of the support legs 20 and the fastening groove walls 53 are flush with the forwardmost portion of the support arm housing 19. The rearward ends of the support legs 20 extend farther rearward than the fastening groove walls 53. The additional rearward length of the support leg 20 ends serve as tabs 54 that retain a head 37 of a spring means 36. The head 37 is retained between the tabs 54 and the interior rearward edge of the coupling flanges 26 and the interior rear wall of the cavity 45. The head 37 is seated in the vertical groove 44 after the spring means 36 is passed through the vertical hole 42. The spring means 36 is a thin flexible member that is positioned to bear against the semicylindrical seat 49 or the flat seat 30 of the support arm head 29 as shown in FIG. 6. The spring means 36 locks the support arm head 29 into either a second, retracted position 16 represented by the dotted lines or a first, extended position represented by the solid lines of FIG. 6. The spring means 36 supplies a forward force in a direction normal to the tangential point that the spring means 36 and the semicylindrical seat 49 or the flat seat 30 contact each other.

Still referring to FIGS. 4 and 8, the support arm head 29 fits closely within the cavity 49 that receives the support arm head 29. The pivot pins 28 are guided into the bore 27 by the guide slots 21. The pivot pins 28 have dimensions effective to be received in the bore 27 of the coupling flanges 26. As the pivot pins 28 become positioned in the bore 27, the spring means 36 is inserted in the vertical hole 42. The spring means 36 bears on the semicylindrical seat 49 or the flat seat 30 of the support arm head 29. The force supplied by the spring means 36 to the semicylindrical seat 49 or the flat seat 30 restricts the swinging movement of the support arm 12 in a forward or rearward direction and maintains the support arm 12 in a desired position.

Referring now to FIGS. 4 and 6, the support arm head 29 includes a first larger vertical semicylindrical shaft or seat 49 with cylindrical pivot pins 28 concentrically disposed on the top and bottom of the larger semicylindrical shaft. The semicylindrical shaft has a height that corresponds with the vertical distance between the coupling flanges 26. The right forward portion of the larger cylindrical shaft is removed to form a flat surface that is tangentially disposed in relation to the cylindrical pivot pins 28. The flat surface is the flat seat 30 that contacts the spring means 36 when the partial eyeshield 11 is in the second, retracted position 16. The left-hand forward portion of the larger cylindrical shaft, forward of the support arm 12 is beveled to form a surface 31 that does not contact the outer wall 55 of the fastening passage 41 when the support arm 12 is in a second, retracted position. The bore 27 and the coupling flanges 26 are rearwardly offset from the center of the fastening cable 15. The position of the bore 27 and the coupling flanges causes the pivot pins 28 to be rearwardly offset from the center of the fastening cable 15.

Referring to FIG. 6, with the support arm head 29 and the spring means 36 in position, the partial eyeshield 11 may be secured in the second, retracted position 16. To remove the support arm 12 from the second, retracted position 16, a force must be applied to the support arm 12 in a rearward direction. The force must be sufficient to cause the spring means 36 to flex an amount that allows the spring means 36 to disengage the flat seat 30 and engage the semicylindrical seat 49. When the partial eyeshield 11 is extended, the cooperation of the semicylindrical seat 49 of the support arm head 29 and the spring means 36 allow the swinging adjustment forward or rearward of the support arm 12. The spring means 36 supplies sufficient resistive force to the semicylindrical seat 49, allowing the support arm 12 to be placed in a position that is maintained until an intentional force sufficient to move the support arm 12 is applied to the support arm 12.

Referring to FIG. 5, the support housing 19 with the fastening cable 15, spring means 36, and the support arm head 29 are in the first, extended position. As shown in FIG. 5, the tab 37 is locked into place in the head groove 44. The spring means 36 is flexing in response to the contact with the semicylindrical seat 49. The cable lug 40 is in the fastening groove 43 with the fastening cable 15 passing out the fastening passage 41. The fastening cable 15 is placed around the device that the support housing 19 is fastened and is prevented from moving in a direction opposite to the arrow 46 by the cooperation of the pawl 50 and the teeth 39 as shown in FIG. 8.

Referring to FIGS. 4, 6 and 9, on the exterior forward end of the support arm 12 is a flange 23 that limits the horizontal slidable range of motion of the partial eyeshield 11. The flange 23 and the support arm 12 are slidably mounted with relation to each other within the internal channel 24. The flange 23 and support arm 12 enter the partial eyeshield through the opening 25. The range of motion of the partial eyeshield 11 is also limited by the spring means 32. A limit stop 34 on the exterior end of the spring means 32, extending forward therefrom, contacts the interior edge of the flange 23 when the partial eyeshield 11 is slidably adjusted to the exterior-most position. The spring means 32 is a flattened V-shaped, resilient member that slidably fits within the internal channel 24 so that the concave side of the spring means 32 faces forward. The spring means 32 is secured in the internal channel 24 by two spring ribs 33 protruding forward from the interior end of the spring means 32. The spring ribs 33 cooperate with the slot 47 for the spring ribs 33, thus preventing the spring means 32 from moving left or right within the internal channel 24 of the partial eyeshield 11. The spring means 32 also includes a spring finger 35, between the spring ribs 33 that maintains the spring ribs 33 in the slot 47 for the spring ribs 33.

Referring to FIG. 6, the retractable, partial eyeshield assembly 10 is in a first extended position represented by the solid lines. The spring means 36 and the semicylindrical seat 49 are intimately contacted providing resistance to the swinging movement of the support arm 12. The support arm 12 is slidably mounted in the internal channel 24 of the partial eyeshield 11. The spring means 32 is positioned in the internal channel 24 and maintained there by the cooperation between the spring ribs 33, the spring finger 35 and the slot 47 for the spring ribs 33. When the partial eyeshield 11 is moved to the right, the left-most portion of the flange 23 contacts the closed end of the internal channel 24, thus preventing further movement to the right of the partial eyeshield 11. When the partial eyeshield 11 is moved to the left, the right-hand edge of the flange 23 contacts the limit stop 34, thus preventing further movement to the left of the partial eyeshield 11. The relative position of the partial eyeshield 11 on the support arm 12 may be determined by referring to the indicia 58 in FIGS. 4 and 8. The indicia 58 are located on the surface of the support arm 12 that faces the user when the single eye sighting device is before the nonsighting eye. The indicia 58 allow each individual user to quickly reposition the partial eyeshield 11 to accomodate his/her particular field of view. The indicia 58 may include hash marks and letter, numerical, or alphanumeric identifiers. The series of indicia 58 are positioned along the length of the support arm 12 so that the user may easily identify the position of the partial eyeshield 11 in relation to the indicia 58 for later reference.

Referring back to FIG. 6, the contact surface 48 between the spring means 32 and the support arm 12 supplies enough resistive force to maintain the partial eyeshield 11 in a desired position. The range of horizontal movement allows for the fine adjustment and positioning required in order to obstruct the desired portion of the nonsighting eye's medial field of view. When it is desirable to transport the device to which the single eye view finder is attached, the retractable, partial eyeshield assembly 10 may be disengaged and retracted into a second, retracted position 16 adjacent to the lens housing 14. The partial eyeshield 11 is moved from an extended to a retracted position or a retracted to an extended position by applying a manual force to the partial eyeshield 11 or support arm 12 in the direction of the desired movement.

In FIG. 7, the support housing 19 is shown in greater detail, illustrating the support arm 12 in a second, retracted position. As shown, the flat seat 30 is contacting the spring means 36. The corner created by the flat seat 30 and the semicylindrical seat 49 serves as a restriction to the left-hand rotation of the support arm 12. The corner secures the support arm 12 in a second, retracted position. Once the support arm 12 is swung to the left a distance sufficient to cause the spring means 36 to contact the semicylindrical seat 49, the support arm 12 may then be easily adjusted to the desired position. In FIG. 7, the pawl 50 has engaged the teeth 39 of the fastening cable 15, thus preventing the removal of the cable from the fastening passage 41.

Referring to FIG. 8, the cooperation between the teeth 39 of the fastening cable 15 and the pawl 50 of the fastening passage 41 is shown in detail. The teeth 39 and the pawl 50 cooperate in a manner that allows the vertical movement of the fastening cable 15, while restricting the downward movement of the fastening cable 15. This provides a convenient and secure means for fastening the retractable, partial eyeshield assembly 10 of the present invention to the view finder 13.

Referring to FIG. 9, the internal channel 24 of the partial eyeshield 11 is shown in detail. The flange 23, limit stop 34, spring means 32 and spring ribs 33 are easily visible in this view. The slidable movement of the partial eyeshield 11 is resisted to by the resistance created by the friction at surface 48 between the spring means 32 and the support arm 12.

Thus, the present invention provides an easily adjustable, partial eyeshield that is used to occupy a portion of the nonsighting eye's medial field of view that substantially corresponds to the portion of the sighting eye's field of view that contains only the image transmitted through the single eye sighting device's sighting aperture. Unless the partial eyeshield may be adjusted to occupy such portion of the nonsighting eye's medial field of view, the partial eyeshield will not assuredly eliminate binocular rivalry between the portion of the sighting eye's field of view transmitted through the sighting aperture of the single eye sighting device and the image in the corresponding portion of the nonsighting eye's medial field of view. If the partial eyeshield occupies more of the nonsighting eye's field of view than that corresponding portion, it will result in the loss of use of portions of the peripheral and medial fields of view which are of value to the device user. By appropriately positioning the partial eyeshield, when the eyes are turned to view either the left or right direction, the field of view can be maximized. Therefore, the present invention allows for the fine adjustment of the nonsighting eye's medial field of view that is occupied by the partial eyeshield.

The materials chosen for the retractable, partial eyeshield assembly in accordance with the present invention will depend on many factors, including ease of use in the fabrication process, cost, comfort to the user, and shielding capability. While components of opaque, plastic and rubber have been used for the heretofore illustrated embodiments of the invention, it should be understood that other materials and combinations of these materials can be employed for these and other embodiments. Preferably, the materials are adaptable to injection molding processes, and most preferably, the materials include a nylon 12, available commercially as "Grilamide," from Emser Werke AG.

The construction and size of a single eye view finder to which the retractable partial eyeshield of the present invention is attached will also affect the construction and size of the partial eyeshield assembly. For example, in a preferred embodiment, the view finder is of the type which is commonly attached to video cameras, particularly portable video cameras for home use.

While the present invention has been described in conjunction with the preferred embodiments, one of ordinary skill after reading the foregoing specification will be able to affect various changes, substitution of equivalents and other alterations to the articles of manufacture set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. A retractable, partial eyeshield assembly for use by a person in conjunction with a single eye sighting device having a sighting aperature, the person having a sighting eye and nonsighting eye, comprising:

(a) a partial shielding means having dimensions effective to occupy a portion of the nonsighting eye's medial field of view that substantially corresponds to the portion of the sighting eye's field of view that contains only the image transmitted through the single eye sighting device's sighting aperture, the partial shielding means including a channel;

(b) a support arm for slidably mounting the partial shielding means thereon, the support arm allowing sliding adjustment of the partial shielding means to position the partial shielding means before the nonsighting eye to allow the image in the portion of the sighting eye's field of view transmitted through the single eye sighting device's sighting aperature to dominate and suppress the image in the corresponding portion of the nonsighting eye's medial field of view, the support arm further allowing adjustment of the partial shielding means so that a portion of the nonsighting eye's medial field of view is maintained when the partial shielding means is positioned before the nonsighting eye, the support arm including a support head and a body capable of being slidably disposed within the internal channel of the partial shielding means;

(c) a support housing including means for accepting and retaining the support head for swinging movement between first and second positions; and (d) fastening means for securing the support housing to the single eye sighting device.

2. The retractable, partial eyeshield assembly of claim 1, wherein the partial shielding means is opaque.

3. The retractable, partial eyeshield assembly of claim 1, wherein the partial shielding means is slidably mounted to the body of the support arm to allow for the horizontal adjustment of the partial shielding means.

4. The retractable, partial eyeshield assembly of claim 1, wherein the partial shielding means further comprises a spring means positioned in said channel, said spring bearing on said support arm to provide resistance to adjustment of the partial shielding means.

5. The retractable, partial eyeshield assembly of claim 4, wherein spring means comprise a flattened V-shaped, resilient member.

6. The retractable, partial eyeshield assembly of claim 5, wherein the support arm also includes a flange disposed on the end opposite the support head, the flange cooperating with the spring means in a manner effective to limit the range of slidable adjustment of the partial shielding means on the support arm.

7. The retractable, partial eyeshield assembly of claim 1, wherein the first position of the support head is a retracted position placing the partial shielding means outside the nonsighting eye's medial field of view and the second position is an extended position placing the partial shielding means within the nonsighting eye's medial field of view.

8. The retractable, partial eyeshield assembly of claim 7, wherein the partial shielding means is capable of a limited range of swinging movement around the vertical axis of the support head to allow adjustment of the distance between the nonsighting eye and the partial shielding means.

9. The retractable, partial eyeshield assembly of claim 1, wherein the means for accepting and retaining the support head further includes a pair of coupling flanges extending outwardly from the body of the support housing, the coupling flanges having vertically aligned bores therein, and wherein the support head includes a pair of vertically disposed pivot pins having dimensions effective to be received in the bores of the coupling flanges.

10. The retractable, partial eyeshield assembly of claim 9, wherein each coupling flange has a slot therein, allowing the pivot pins to enter the vertically aligned bores in the coupling flanges.

11. The retractable, partial eyeshield assembly of claim 10, wherein the support head further includes a semicylindrical seat vertically disposed between the pivot pins that allows for the swinging adjustment of the support arm, and wherein the support housing includes a spring means positioned to bear against the seat and provide frictional resistance to rotation in said support head.

12. The retractable, partial eyeshield assembly of claim 11, wherein the support head further comprises a flat seat vertically disposed between the pivot pins, the spring means bearing against the flat seat to releasably retain the support head and thus the partial shielding means in a retracted position.

13. The retractable, partial eyeshield assembly of claim 1, wherein the support housing further includes a means defining a passage for the fastening means, the passage including a fastening pawl, the fastening means further including a flexible fastening cable, the flexible fastening cable including a fastening cable lug on one end, and fastening teeth on one surface, the fastening teeth cooperating with the fastening pawl to retain the notched portion of the fastening cable within the passage.

14. The retractable, partial eyeshield assembly of claim 13, wherein the support housing further includes a fastening groove joining the fastening passage and the exterior of the support housing, the fastening groove cooperating with the cable lug to retain the cable lug within the fastening groove.

15. The retractable, partial eyeshield assembly of claim 14, wherein the cable lug is wider than the cable surface with the fastening teeth and extends outwardly from the cable surface with the fastening teeth and wherein the fastening groove has dimensions substantially equivalent to the dimensions of the cable lug, the fastening groove extending from the fastening passage to the exterior of the support housing, the lug being retained on the exterior of the support housing.

16. The retractable, partial eyeshield assembly of claim 1 wherein said means for accepting and retaining the support head for swinging movement between first and second positions releasably accepts said support head.

17. The retractable, partial eyeshield assembly of claim 1, wherein said support arm carries indicia for indicating the relative position of said partial shielding means to said support housing.

18. A retractable, partial eyeshield assembly for use by a person in conjunction with a single eye sighting device having a sighting aperture, the person having a sighting eye and a nonsighting eye, comprising:
(a) a partial shielding means having dimensions effective to occupy a portion of the nonsighting eye's medial field of view that substantially corresponds to the portion of the sighting eye's field of view that contains only the image transmitted through the single eye sighting device's sighting aperture,
(b) a support arm and means mounting said partial shielding means on said support arm for lateral movement relative to the nonsighting eye's line of sight to position the partial shielding means before the nonsighting eye and to allow the image in the portion of the sighting eye's field of view transmitted through the single eye sighting device's sighting aperture to dominate and suppress the image in the corresponding portion of the nonsighting eye's medial field of view, the mounting means further allowing adjustment of the partial shielding means so that a portion of the nonsighting eye's medial field of view is maintained when the partial shielding means is positioned before the nonsighting eye, the support arm including a support head and a body said mounting means associated with said body,
(c) a support housing including means for accepting and retaining the support head for movement between first and second positions, said partial shielding means in said first position being positioned in the nonsighting eye's medial field of view and in said second position substantially clearing said nonsighting eye's medial field of view, and
(d) fastening means for securing the support housing to a single eye sighting device.

19. A retractable, partial eyeshield assembly for use by a person in conjunction with a single eye sighting device having a sighting aperture, said person having a sighting eye and a nonsighting eye, comprising:
(a) a partial shielding means having dimensions effective to occupy a portion of the nonsighting eye's medial field of view that substantially corresponds to the portion of the sighting eye's field of view that contains only the image transmitted through the single eye sighting device's sighting aperture;
(b) mounting means for mounting said partial shielding means to the single eye sighting device, said mounting means including adjustment means mounting said partial shielding means for lateral movement relative to the sighting eye.

20. The retractable, partial eyeshield assembly of claim 19, wherein said mounting means further includes means for adjusting the partial shielding means for movement in a fore and aft direction relative to the sighting eye.

21. The retractable, partial eyeshield assembly of claim 19, wherein said partial shielding means is releasably secured to said mounting means.

22. The retractable, partial eyeshield assembly of claim 19, wherein said mounting means is detachably fastened to the single eye sighting device.

23. A video camera accessory kit comprising:
(a) a retractable, partial eyeshield assembly for use by a person in conjunction with a single eye sighting device having a sighting aperture, said person having a sighting eye and a nonsighting eye; and
(b) said partial eyeshield assembly is comprised of a partial shielding means having dimensions effective to occupy a portion of the nonsighting eye's medial field of view that substantially corresponds to the portion of the sighting eye's field of view that contains only the image transmitted through the single eye sighting device's sighting aperture; and
(c) mounting means for mounting said partial shielding means to the single eye sighting device, said mounting means including adjustment means mounting said partial shielding means for lateral movement relative to the sighting eye.

24. The video camera accessory kit of claim 23, further comprising instructions for use.

25. A retractable, partial eyeshield assembly for use by a person in conjunction with a single eye sighting device having a sighting aperture, said person having a sighting eye and a nonsighting eye, comprising:
(a) a partial shielding means having dimensions effective to occupy a portion of the nonsighting eye's medial field of view that substantially corresponds to the portion of the sighting eye's field of view that contains only the image transmitted through the single eye sighting device's sighting aperture;

(b) mounting means for mounting said partial shielding means to the single eye sighting device, said mounting means including adjustment means mounting said partial shielding means for fore and aft movement relative to the sighting eye.

* * * * *